United States Patent [19]
Gallatin

[11] 3,942,553
[45] Mar. 9, 1976

[54] DIGITAL FLUID FLOW CONTROL SYSTEM WITH TRIM ADJUSTMENT

[75] Inventor: Robert A. Gallatin, Newport Beach, Calif.

[73] Assignee: Process Systems, Inc., Salt Lake City, Utah

[22] Filed: Jan. 10, 1974

[21] Appl. No.: 432,152

[52] U.S. Cl. .................. 137/599; 251/122; 251/124
[51] Int. Cl.[2] .......................................... F16K 11/24
[58] Field of Search ..................... 91/31; 137/599

[56] References Cited
UNITED STATES PATENTS

| | | | |
|---|---|---|---|
| 1,436,417 | 11/1922 | Trumble | 137/599 X |
| 2,999,482 | 9/1961 | Bower | 91/31 |
| 3,308,619 | 3/1967 | Richardson | 137/599 X |
| 3,726,296 | 4/1973 | Friedland et al. | 137/1 |
| 3,778,038 | 12/1973 | Eversole et al. | 261/50 R |
| 3,785,389 | 1/1974 | Friedland et al. | 137/1 |

*Primary Examiner*—Robert G. Nilson
*Attorney, Agent, or Firm*—Christie, Parker & Hale

[57] ABSTRACT

Individually actuatable digital valve elements in parallel interconnect a fluid source to a receiver. In the flow passage of each valve element, there is a converging-diverging nozzle that feeds into the receiver. A trim adjustment screw is movable along the axis of each nozzle to vary the effective cross-sectional area of such nozzle. The nozzle and screw are part of an insert that can be mounted in the valve body after individual calibration.

19 Claims, 3 Drawing Figures

DIGITAL FLUID FLOW CONTROL SYSTEM WITH TRIM ADJUSTMENT

BACKGROUND OF THE INVENTION

This invention relates to the control of fluid flow and, more particularly, to a digital fluid flow control system with a trim adjustment.

In a digital fluid flow control system, a plurality of individually actuatable, digital valve elements are interconnected in parallel between an upstream manifold and a downstream manifold. The digital valve elements are bistable, i.e., either open or closed, and are actuated by binary electrical signals weighted in value according to a binary code. The cross-sectional orifice areas of the valve elements are also weighted relative to each other according to the binary code. The fluid flow rate from the upstream manifold to the downstream manifold is controlled by opening and closing the valve elements in different combinations, responsive to the binary actuating signals; due to the identical weighting of the binary actuating signals and the orifice areas of the valve elements, the sum of the orifice areas of the open valve elements is proportional to the number represented by the binary actuating signals in the binary code.

The requirement that the cross-sectional orifice areas of the valve elements be weighted relative to each other according to the binary code imposes close tolerances upon the dimensions of the valve elements during manufacture. In order to calibrate the valve elements accurately to achieve the proper relative weighting, the valve elements must usually be removed from the valve body in the course of calibration one or more times for reboring or reworking. The closer the tolerances are held, the more reworking is required. The problem of proper calibration is particularly troublesome when the flow determining orifices are converging-diverging nozzles, as disclosed in a copending application of Harry Friedland and Addison W. Langill, Jr., Ser. No. 432,153, filed on even date herewith, and assigned to the assignee of the present application by an assignment recorded on even date herewith. Since the nozzle shape is important, a change in the effective cross-sectional orifice area of the nozzle requires complete reworking of the nozzle dimensions.

SUMMARY OF THE INVENTION

According to the invention, converging-diverging nozzles in digital valve elements of a fluid flow control system are provided with a trim adjustment slug that is movable along the axis of the nozzle. The movement of the slug varies the effective cross-sectional area of the nozzle by disrupting the flow in its converging section.

In the preferred embodiment, each nozzle is formed in a threaded insert that can be mounted in the valve body. The trim adjustment slug is a screw supported by a cage. The insert is also supported by the cage. Therefore, the nozzle and the trim adjustment slug are part of a single replaceable unit, and their relative positions are fixed by the trim adjustment. To improve nozzle efficiency, the end of the slug is preferably conical.

During manufacture, each nozzle is formed in its insert with dimensions slightly larger than the calculated values for the desired relative effective cross-sectional orifice area of the valve element, then each cage with insert and slug is individually placed on a flow stand where it is calibrated exactly to the desired effective orifice area by turning the trim adjustment slug. After calibration, each cage with insert and slug is screwed as a unit into a bore in the valve body. This procedure substantially facilitates manufacturing because close tolerances do not have to be held. Placement of the entire system including the bulky valve body on the flow stand for calibration is also avoided, and easy replacement or readjustment of the effective area of the flow determining orifices is permitted.

BRIEF DESCRIPTION OF THE DRAWINGS

The features of the specific embodiments of the best mode contemplated of carrying out the invention are illustrated in the drawings, in which.

DETAILED DESCRIPTION OF THE SPECIFIC EMBODIMENTS

Figure 1:
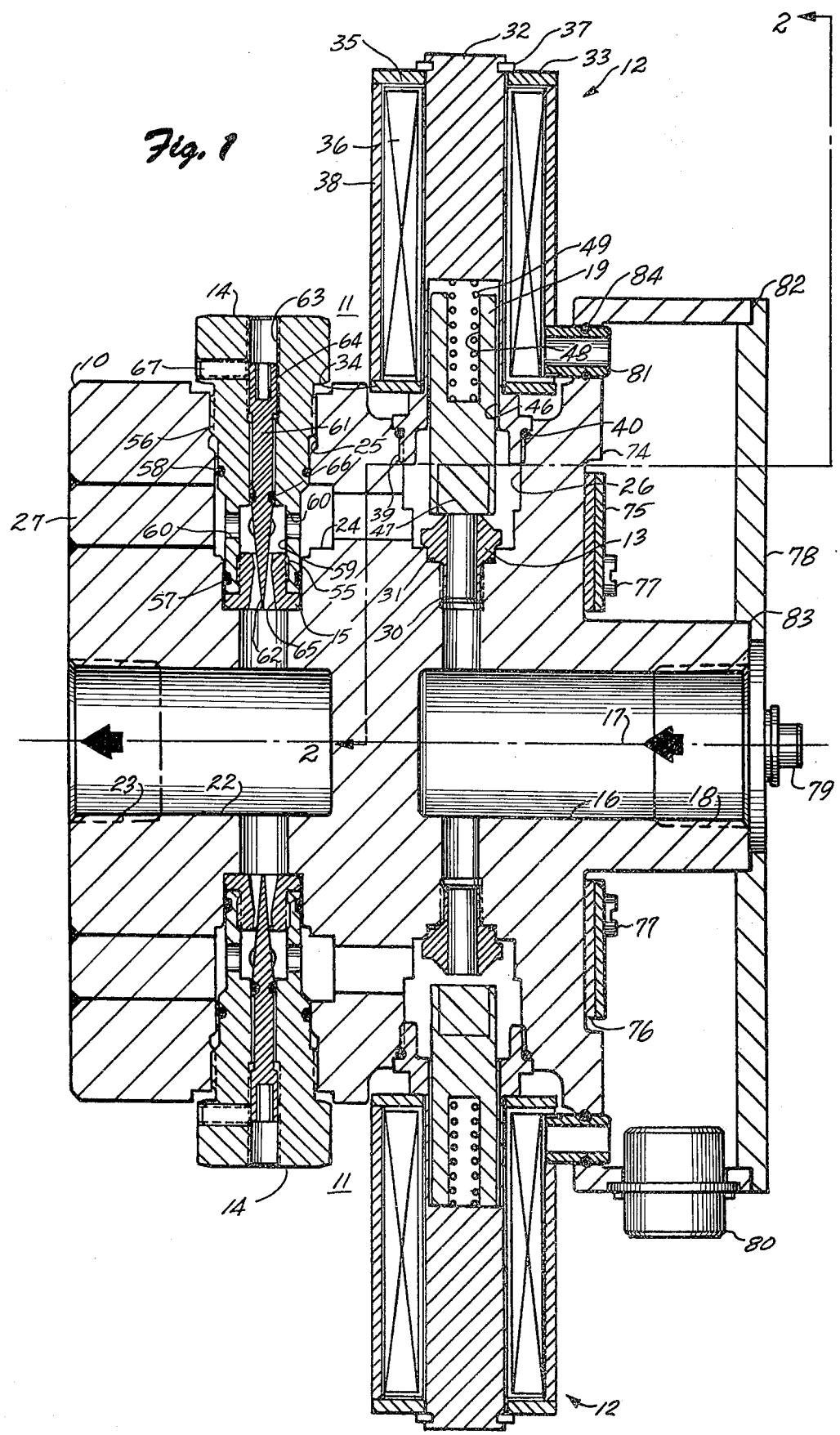
FIG. 1 is a side, partially sectional view of a digital fluid flow control system incorporating the principles of the invention.
Figure 2:
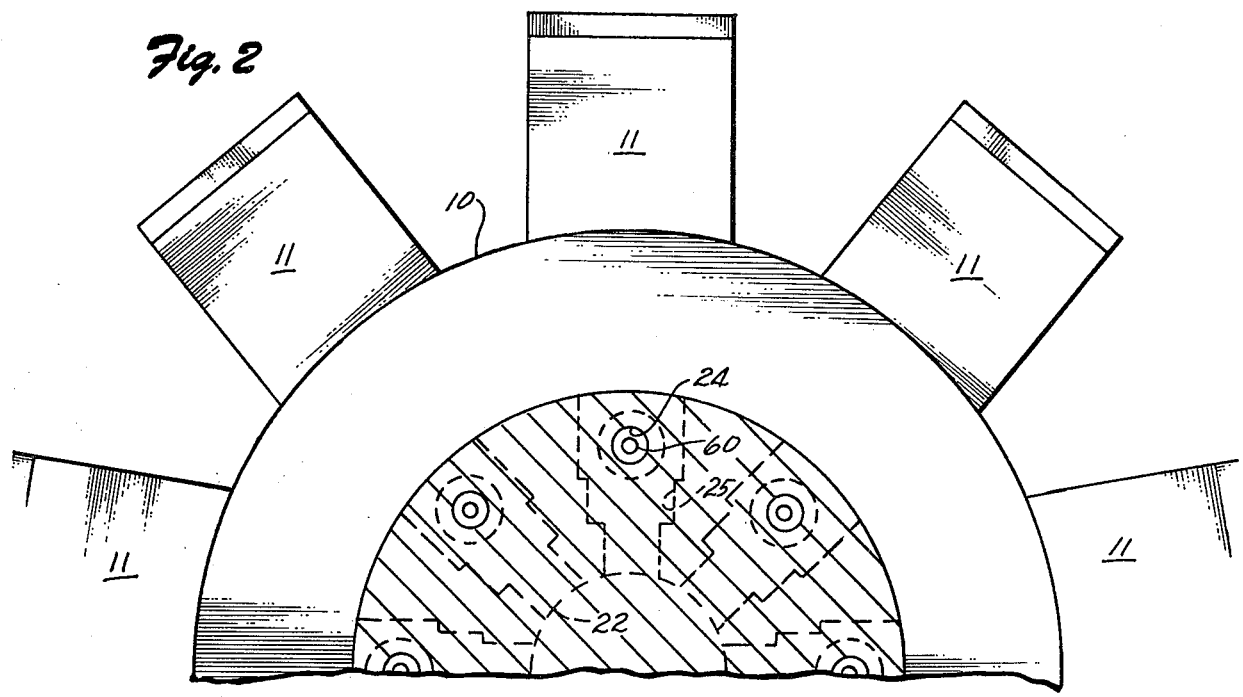
FIG. 2 is a fragmentary front view of the system of FIG. 1.

Reference is made to FIGS. 1 and 2 in which a digital fluid flow control system primarily designed to handle a compressible fluid such as air, which comprises a valve body 10 and a plurality (i.e., nine) of digital valve elements 11. Each of valve elements 11 has a plug actuating assembly 12, a sealing orifice insert 13, an adjustment insert 14, and an isolating orifice insert 15.

Valve body 10 is made from a single substantially cylindrical piece of material not chemically reactive with the fluid, such as iron. An upstream conduit 16 is drilled in valve body 10 from one end surface thereof in alignment with a cylindrical axis 17 of body 10. Threads 18 are formed at the entrance of conduit 16 for connection to a source of compressible fluid, e.g., air (not shown). A downstream conduit 22 is drilled in valve body 10 from the opposite end surface thereof in alignment with axis 17. Threads 23 are formed at the entrance of conduit 22 for connection to a fluid receiver (not shown). As shown by the solid arrows, fluid flows along axis 17 from right to left as viewed in FIG. 1. For each valve element 11, a bore 24 is drilled in valve body 10 from its downstream end surface spaced laterally from and parallel to axis 17; a bore 25 is drilled perpendicular to axis 17 in valve body 10 from its cylindrical side surface through bore 24 to downstream conduit 22; and a bore 26 is drilled perpendicular to axis 17 in valve body 10 from its cylindrical side surface through bore 24 to upstream conduit 16. The end of bore 24 of each valve element 11 between bore 25 and the downstream end surface of valve body 10 is sealed by a plug 27 made of the same material as valve body 10.

Insert 13 has a threaded connection 30 with the portion of bore 26 between bore 24 and upstream conduit 16. Threaded connection 30 is sealed by an O-ring 31. Plug actuating assembly 12 overlies insert 13 in axial alignment therewith. Assembly 12 comprises a core 32 made of a magnetic material, annular end caps 33 and 34 made of a magnetic material, a bobbin 35 made of a non-magnetic material, an electric coil 36 wrapped around bobbin 35, a snap ring 37 made of a magnetic material, and a hollow cylindrical cover 38 made of a magnetic material. Core 32 has a threaded connection 39 with the portion of bore 26 between bore 24 and the exterior of valve body 10. An O-ring 40 seals threaded connection 39. Bobbin 35 and coil 36 fit around core 32. End cap 34 at one end of bobbin 35 is retained by an annular shoulder formed on core 32, and end cap 33 at the other end of bobbin 35 is retained by snap ring 37, which is secured in a groove at the end of core 32. Cover 38 is retained between end caps 33 and 34.

A plug 19, which is made of a magnetic material, rides back and forth in a direction perpendicular to axis 17 within a recess 46 in core 32. Plug 19 has a sealing insert 47 made of a suitable sealing material such as an elastomer rubber at its end facing orifice insert 13. Plug 19 has a recess 48 that retains a compression spring 49 at its end opposite orifice insert 13. In the absence of the application of an actuating signal to coil 36, spring 49 urges plug 19 downward to press sealing insert 47 against orifice insert 13, thereby closing the digital valve element. When a binary actuating signal is applied to coil 36, an external magnetic flux path is established in core 32, plug 19, end cap 34, cover 38, and end cap 33. The resulting magnetic force overcomes spring 49 and draws plug 19 up against core 32, thereby opening the digital valve element.

Isolating orifice insert 15 rests on a shoulder formed in bore 25, where it is retained by adjustment insert 14. Adjustment insert 14 has a threaded connection 55 with orifice insert 15 and a threaded connection 56 with bore 25. O-rings 57 and 58 seal insert 14. A cavity 59 is formed within insert 14 and perforations 60 connect bore 24 with cavity 59. Perforations 60 are as large and numerous as possible to prevent restriction of flow therethrough. The side walls of insert 14 in which perforations 60 are formed and cavity 59 define a stationary cage through which fluid flows to conduit 22. An adjusting screw 61 having a conical end 62 resides in a bore 63, which extends between the exterior of insert 14 and cavity 59. Screw 61 has a threaded connection 64 with bore 63. An O-ring 66 seals threaded connection 64. A converging-diverging nozzle 65 is formed in insert 15 to interconnect the interior of cavity 59 with bore 25. Conical end 62 of screw 61 is centered within nozzle 65 and extends through its throat. As screw 61 is adjusted, end 62 moves along the axis of nozzle 65 and its effective cross-sectional area varies.

At its upstream end, valve body 10 has an annular cavity 74 around upstream conduit 16 for housing the electrical components that drive actuating assemblies 12. The electrical components are mounted on an annular terminal board 75, which together with an annular backup board 76 is attached to valve body 10 by fasteners such as those designated 77. An annular cover 78 is secured to valve body 10 by fasteners such as that designated 79. Binary electrical actuating signals from a digital computer or other source are coupled through a connector 80 to the components on terminal board 75. The actuating signal for driving plug actuating assembly 12 of each valve element 11 is coupled from cavity 74 to coil 36 by a conduit 81 that extends between cavity 74 and cover 38. Gaskets 82 and 83 seal the interface of cover 78 and valve body 10. An O-ring 84 seals the point of exit of each conduit 81 from cavity 74. As a result, cavity 74 is completely sealed and can be purged for the purpose of maintaining a non-explosive and/or cooling environment for terminal board 75.

When a binary actuating signal is applied to coil 36 of one of valve elements 11, plug 19 is lifted off orifice insert 13 and the valve element is in its open state. Fluid then flows from upstream conduit 16 to downstream conduit 22 through a flow passage comprising bore 26, insert 13, bore 24, perforations 60, cavity 59, nozzle 65, and bore 25.

Nozzle 65 is the flow determining orifice in the flow passage through an open valve element 11. The ratio of the cross-sectional areas of nozzles 65 is in accordance with the weighting of the binary signals that actuate them. Thus, for example, the ratio of the cross-sectional areas of nozzles 65 could vary in accordance with a straight geometric progression of two (i.e., 1, 2, 4, 8, 16, 32, 64, 128, 256), or could vary in accordance with a modified geometric progression of two (i.e., 1, 2, 4, 8, 16, 32, 32, 32). Trim adjustment of the ratio of effective cross-sectional areas of nozzles 65 is accomplished by turning screw 61. The trim adjustment is maintained by a set screw 67. The other cross-sectional dimensions of the flow passages through digital valve elements 11 are all identical and substantially larger than the cross-sectional dimensions of nozzles 65.

For a given pressure in upstream conduit 16, the pressure in downstream conduit 22 varies as valve elements 11 are opened and closed; the minimum pressure difference occurs when all of valve elements 11 are open. The sum of all the flow determining orifices of valve elements 11 is designed to be small enough, vis-a-vis, the external "plumbing" to which the flow control system is connected and sufficient pressure is provided in upstream conduit 16 so that the fluid flowing through the open digital valve elements 11 travels at sonic velocity at the throat of each nozzle 65 for all combinations of states of valve elements 11. As a result, the throats of nozzles 65 serve to isolate the upstream portions of the passages through the valve elements from the downstream portions thereof, which are subject to pressure variations as the pressure in downstream conduit 22 varies. In other words, pressure variations in downstream conduit 22 do not affect the flow rate through an open digital valve element 11, which is solely determined by the pressure and temperature in upstream conduit 16.

To summarize, nozzles 65 serve as both the isolating orifices and the flow determining orifices of digital valve elements 11. As taught in application Ser. No. 169,930, the flow rate through open digital valve elements 11 remains essentially unaffected by variations in the position of plug 19. The flow determining orifices are substantially smaller than the sealable orifices so the flow rate essentially is only dependent upon the cross-sectional area of the flow determining orifices.

As used in this specification, the term "flow determining orifices" means portions of the flow passages through the respective digital valve elements that have cross-sectional areas in a ratio equal to the weighting in the binary code or the binary signals actuating the digital valve elements.

The invention to which the application of Harry Friedland and Addison W. Langill, Jr., Ser. No. 432,153, filed on even date herewith, and assigned to the assignee of this application by an assignment recorded on even date herewith, is directed, is the use of converging-diverging nozzles as the flow determining orifices in a digital fluid flow control system. The disclosure of the Friedland and Langill application is incorporated herein by reference. The invention to which the present application is directed is the use of a trim adjustment screw in such nozzles.

Figure 3:
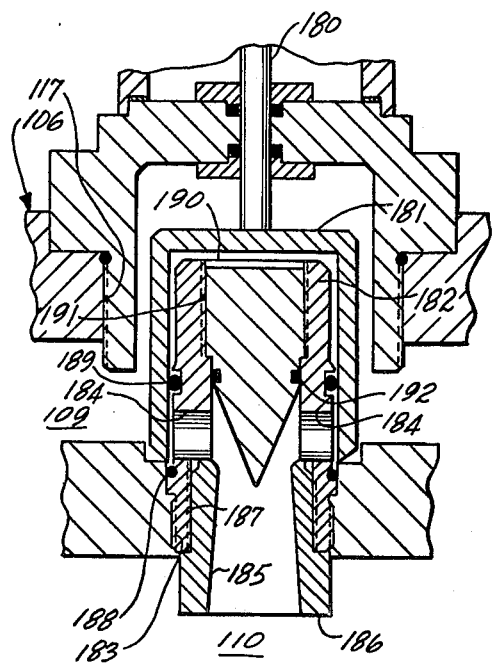
FIG. 3 is a side sectional view of an alternative version of a single digital valve element incorporating the principles of the invention.

In FIG. 3 is disclosed a valve element designed for the system of FIG. 4 of the Friedland and Langill application. The plug actuating assembly, which is not shown, could be a two-stage arrangement, a pneumatic power stage controlled by a magnetic pilot stage, as disclosed in U.S. Pat. No. 3,746,041, the disclosure of which is incorporated herein by reference. The end of a stem 180, which is driven by the power stage of the actuating assembly, is attached to a movable plug 181. A stationary cage 182 over which plug 181 rides up and down has a threaded connection 183 with bore 117. Cage 182 has a plurality of perforations 184 formed in its side to interconnect upstream manifold 109 with the interior of cage 182. A converging-diverging nozzle 185 formed in an insert 186 leads from the interior of cage 182 to downstream manifold 110. Insert 186 has a threaded connection 187 with cage 182. Nozzle 185, which is designed to handle a compressible fluid such as air, has a short curved converging section and a long straight diverging section. When the valve element is in the closed state, the end of plug 181 contacts an O-ring 188, which seals the interface between bore 117 and cage 182 and the bottom of plug 181. An O-ring 189 seals the top of plug 181. When the digital valve element is in the open state, the end of plug 181 lies above perforations 184 in cage 182. An adjustable screw 190 has a threaded connection 191 sealed by an O-ring 192. The end of screw 190 has a centered conical surface that protrudes into nozzle 185. As screw 190 is turned, the axial movement of its conical surface changes the flow rate through nozzle 185, thereby providing a trim adjustment on the effective orifice area of the valve element.

Nozzles 65 and 185 are designed to operate in the manner described in connection with FIG. 3 of the Friedland and Langill application. If the control system in which the nozzles are employed handles liquid instead of a compressible fluid, then nozzles designed to operate as cavitating venturis would be substituted for the compressible fluid nozzles disclosed in FIGS. 1 and 3. Such liquid nozzles would be designed to operate in the manner described in connection with FIG. 5 of the Friedland and Langill application. In terms of the equipment disclosed in FIGs. 1 and 3, it would only be necessary to substitute for inserts 15 and 186 inserts in which liquid nozzles are formed; the remaining components of the cage and trim adjustment screw are employed both for liquid and compressible fluid.

In practice, each nozzle is formed in its cage with dimensions about 5% larger than the calculated values and then each cage with insert is individually placed on a flow stand where it is calibrated exactly to the desired effective orifice area by turning the trim adjustment screw. The values of the fluid flow rate determinative parameters are maintained constant for the calibration of all the valve elements. For example, if the nozzles operate as sonic velocity gas flow nozzles, the absolute upstream pressure and temperature are maintained constant for all the valve elements. The trim adjustment screw of each valve element is varied until the measured flow rate through it is the same value relative to the other valve elements as the weighted value of its binary actuating signal. When this occurs, the effective orifice area of the valve element is the desired value relative to the other valve elements. If the nozzles operate as subsonic gas flow nozzles, the absolute downstream pressure is also maintained constant for all the valve elements. If the nozzles are operated as liquid cavitating venturis, the upstream gauge pressure is maintained constant, and if the nozzles are operated as liquid non-cavitating venturis the difference between the upstream and downstream pressures is maintained constant. Reference is made to the equations in a copending application of Robert A. Gallatin and Addison W. Langill, Jr., Ser. No. 432,158, now U.S. Pat. No. 3,875,955, filed on even date herewith, and assigned to the assignee of the present application by an assignment recorded on even date herewith, which application is incorporated herein by reference. In the case of liquid, trim adjustment of a valve element varies $C_V$ and $Q$ in equations (1) and (2), all other variables being constant. In the case of gas, trim adjustment of a valve element varies $A_e$ and $w'$ in equation (3), all other variables being constant. After the trim adjustment is completed, further movement of the screw 190 is prevented by use of a potting compound or the like. Finally, each calibrated cage with insert is screwed as a unit into its bore (i.e., 25 or 117). This procedure substantially facilitates manufacturing because close tolerances do not have to be held. This procedure also avoids having to place the entire system including the bulky valve body on the flow stand for calibration, and permits easy replacement or readjustment of the flow determining orifices of the system.

Although conical trim adjusting surfaces, as shown, are preferred from the point of view of nozzle efficiency, the ends of the trim adjustment screws could be truncated or blunt. In either case, the effective orifice area of the nozzle changes as the screw moves axially. It is not necessary for the end of the trim adjustment screw to protrude to the throat of the nozzle; the screw must only protrude toward the nozzle enough to disrupt the flow in the converging section of the nozzle.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For exammle, the trim adjustment could be used in a digital fluid flow control system where the nozzles do not operate as cavitating venturis or sonic flow nozzles.

What is claimed is:

1. A digital fluid flow control system comprising:
   an upstream manifold;
   a downstream manifold; and
   a plurality of individually actuatable, digital valve elements each having a fluid flow passage interconnecting the manifolds, a converging-diverging nozzle having an axis along the flow passage, a slug movable along the axis to disrupt the flow through the nozzle, a bistable plug, and means for positioning the plug exclusively in an open position or a closed position, the plug preventing fluid flow through the passage in the closed position and permitting fluid flow through the passage in the open position.

2. The system of claim 1, in which the slug has a conical surface that extends into the nozzle from its upstream end.

3. The system of claim 2, in which a stationary cage is formed in the flow passage of each digital valve element, the cage has a perforated side connecting the interior of the cage with the upstream manifold and an open end connecting the interior of the cage with the downstream manifold, the converging-diverging nozzle of each digital valve element is located at the open end of the corresponding cage, and the slug extends through the interior of such cage to its open end.

4. The system of claim 3, in which the slug is a screw having a threaded connection with the cage and the converging-diverging nozzle is formed in an insert having a threaded connection with the cage.

5. The system of claim 4, in which the manifolds and the flow passages are formed in a valve body having bores intersecting the respective flow passages and the cages have threaded connections with the respective bores in the valve body such that each cage with its screw and insert is individually removable as a unit from the valve body.

6. The system of claim 5, in which the screw is mounted at the end of the cage opposite the open end and moves in the direction of the open end upon adjustment.

7. The system of claim 6, in which the plug of each valve element rides up and down over the corresponding cage and covers the screw mounted therein, the plug uncovering the perforations in the open position and covering the perforations in the closed position.

8. The system of claim 1, in which a stationary cage is formed in the flow passage of each digital valve element, the cage has a perforated side connecting the interior of the cage with the upstream manifold and an open end connecting the interior of the cage with the downstream manifold, the converging-diverging nozzle of each digital valve element is located at the open end of the corresponding cage, and the slug extends through the interior of such cage to its open end.

9. The system of claim 1, in which each digital valve element includes a housing with one or more perforations forming part of the flow passage and the slug is a screw having a threaded connection with the housing.

10. The system of claim 9, in which the converging-diverging nozzle is formed in an insert having a threaded connection with the housing in spaced relationship from the screw.

11. The system of claim 10, in which the manifolds and the portions of the flow passages outside the housings are formed in a valve body having bores intersecting the respective flow passages and the housings have threaded connections with the respective bores in the valve body such that each housing with its screw and insert is individually removable as a unit from the valve body.

12. The system of claim 11, in which the plug of each valve element rides up and down over the corresponding housing and covers the screw, the plug uncovering the perforations in the housing in the open position and covering the perforations in the housing in the closed position.

13. A fluid flow control system having:
 a source of fluid at a first pressure;
 a fluid receiver at a second pressure lower than the first pressure; and
 a plurality of individually actuatable, digital valve elements each having a fluid flow passage interconnecting the source to the receiver, a nozzle having a converging section in the flow passage, a diverging section in the flow passage, and a throat between the converging and diverging sections, a bistable plug, and means for positioning the plug exclusively in an open position or a closed position, the plug preventing fluid flow through the passage in the closed position and permitting fluid flow through the passage in the open position, the difference between the first and second pressures being sufficiently high that the pressure at the throat of the nozzle is independent of the second pressure;
 the improvement comprising means for adjusting the effective orifice areas of the respective nozzles.

14. The system of claim 13, in which the fluid is compressible and the difference between the first and second pressures is sufficiently high that the fluid flows through the throat of the nozzle at sonic velocity.

15. The system of claim 13, in which the fluid is a liquid and the difference between the first and second pressures is sufficiently high that the fluid flowing through the nozzle is in its gas phase at the throat.

16. The system of claim 13, in which the adjusting means comprises a slug movable in the direction of flow through the nozzle so as to disrupt the flow through the nozzle to an extent determined by the position of the slug.

17. The system of claim 16, in which the slug extends into the converging section of the nozzle from the source.

18. The system of claim 17, in which the slug has a conical surface centered within the nozzle.

19. The system of claim 16, in which the fluid is a liquid and the difference between the first and second pressures is sufficiently high that the fluid flowing through the nozzle is in its gas phase at the throat.

* * * * *